United States Patent [19]
Plath

[11] Patent Number: 6,003,343
[45] Date of Patent: Dec. 21, 1999

[54] CIRCULAR KNITTING MACHINE WITH A DIAL LUBRICATING DEVICE

[75] Inventor: Ernst-Dieter Plath, Albstadt, Germany

[73] Assignee: SIPRA Patententwicklungs- und Beteiligungsgesellschaft mbH, Albstadt, Germany

[21] Appl. No.: 09/103,944

[22] Filed: Jun. 24, 1998

[30] Foreign Application Priority Data

Jun. 27, 1997 [DE] Germany ............................ 197 27 498

[51] Int. Cl.⁶ .............................. D04B 9/06; D04B 9/08; D04B 35/28; F16N 1/00
[52] U.S. Cl. ........................... 66/8; 66/168; 66/31; 66/19
[58] Field of Search ................ 66/168, 31, 19, 66/8; 184/106

[56] References Cited

U.S. PATENT DOCUMENTS

| | | | |
|---|---|---|---|
| 2,723,543 | 11/1955 | Chiodine et al. | 66/19 |
| 3,817,058 | 6/1974 | Lombardi | 66/8 |
| 4,719,768 | 1/1988 | Lonati | 66/8 |

FOREIGN PATENT DOCUMENTS

| | | |
|---|---|---|
| 0 036 195 | 9/1981 | European Pat. Off. . |
| 0 038 437 | 10/1981 | European Pat. Off. . |
| 1 635 931 | 2/1972 | Germany . |
| 36 24 982 | 12/1991 | Germany . |
| 41 28 372 A1 | 3/1993 | Germany . |
| 797677 | 7/1958 | United Kingdom . |
| 1 207 682 | 10/1970 | United Kingdom . |

OTHER PUBLICATIONS

"Knitting Machines and Aerosol Lubrication", The Hosiery Trade Journal, Feb. 1966, pp. 127–131.

Primary Examiner—Andy Falik
Attorney, Agent, or Firm—Michael J. Striker

[57] ABSTRACT

A circular knitting machine with a dial arrangement, has a rotatable dial (2), a stationary dial cam system (12), a device (23) for feeding a lubricant to the dial arrangement and a collecting container (29) for reception of lubricant escaping from the dial arrangement. Elements (27) are associated with the dial arrangement which prevent or at least reduce the escape of lubricant consequent upon the effect of the centrifugal force over the radially outer edge of the dial (2).

10 Claims, 3 Drawing Sheets

CIRCULAR KNITTING MACHINE WITH A DIAL LUBRICATING DEVICE

BACKGROUND OF THE INVENTION

This invention relates to a circular knitting machine with a dual which includes a dial rotatable about an axis of rotation and having tricks for knitting implements, a stationary dial cam system, a device for feeding a lubricant to the dial arrangement and a collecting container for reception of lubricant escaping from the dial arrangement.

Circular knitting machines with a needle cylinder and optionally with a dial or a sinker ring are usually provided with lubricating devices, in order to feed a lubricant, especially oil, to the respective knitting implement carriers and the cam system parts associated therewith. The lubricant is introduced through nozzles, which are provided in the stationary cam system parts, to the knitting implement carriers and the knitting implements disposed therein, from whence it reaches inter alia the cam channels of the cam system parts provided to guide the knitting implements butts. It is further known to provide the needle cylinder region for example with numerous annular grooves to improve the distribution of the lubricant (DE-AS 1 635 931).

The effect which is achieved on the one hand in desired manner by the lubrication is that friction which arises is reduced and the concomitant wear is kept within bounds. On the other hand there is also an undesirable side effect, that excess lubricant gets into the knitwear produced with the circular knitting machine and then has to be washed out of this. Accordingly it would be ideal to feed only as much lubricant as is actually used by the knitting machine. However, it has only been possible to achieve this in the past on the one hand with a high technological outlay, because it is not possible to perform accurate enough metering with conventional lubricating devices. On the other hand, a certain excess of lubricant is not entirely undesirable, because other objectives can also be met with the lubricant. Among these are for example the dissipation of heat of friction or flushing away foreign bodies, e.g. yarn lint, out of the tricks of the knitting implement carriers or the cam system channels. A means of removing the excess proportion of the lubricant, which is not used in the circular knitting machine but which is desirable on account of these advantages, is therefore sought, so that the lubricant is caught by special means, particularly collecting containers, insofar as it runs off below in the knitting implement carriers, on account of gravity.

Experience shows that undesirably large amounts of lubricant get into the fabric made on the circular knitting machine, in spite of such measures, even when fine distribution and thus careful usage of lubricant is sought after through aerosol-like atomisation ("The Hosiery Trade Journal", February 1966, pp 127–131). This applies in particular to circular border knitting machines, i.e. circular knitting machines which are equipped with a dial, and is attributed to the fact that lubricant is transferred to the fabric by the knitting implements themselves. In order to avoid this problem it is accordingly known (U.S. Pat. No. 2,723,543) to use knitting implement carriers in which the actual carrying part (or needle bed) is separated from the knock-over part (or knock-over cam) by a recess disposed below the backs of the knitting implements and in which knitting implements are provided with strongly bent shank sections like webs which bridge over the recess at a sufficient distance. Interruption of the lubricant flow is to be achieved or the pumping action of the knitting implements is to be avoided by this. However, such devices have proved to be inadequate, especially in modern circular knitting machines operating at high speeds. Apart from this it is as a rule undesirable to provide knitting implements with the described shape. Accordingly it is generally the case in the use of modern circular border knitting machines basically to take into account contamination of the knitwear with lubricant and instead to enrich the lubricant with emulsifiers which improve the ability to wash it out and thus facilitate the removal of the lubricant from the knitwear. However, since such emulsifiers affect the lubricating quality and thus the lubricating characteristics of the lubricant adversely, they are undesirable in principle.

SUMMARY OF THE INVENTION

The invention is therefore based on the object of so improving a circular knitting machine of the kind initially specified that the introduction of lubricant to the fabric produced thereon is largely prevented or is at least substantially reduced, even at high speeds.

A further object of this invention is to design the knitting machine such that means are provided which prevent or reduce an escape of lubricant by the effect of centrifugal force.

Yet another object of this invention is to prevent or reduce the contamination of the fabric with lubricant by simple constructional means.

These and other objects which will become aware hereinbelow are solved in accordance with this invention by providing means which are associated with the dial arrangement and which prevent or at least reduce the escape of lubricant consequent upon the effect of the centrifugal force over the radially outer edge of the dial.

The invention is based on the idea that, in the case of circular knitting machines provided with dial arrangements, excess lubricant gets into the fabric less through the pumping action of the knitting implements referred to above than through the appreciable centrifugal forces, especially at high speeds. Since the dial is a disc rotating at high sped in operation, in which the tricks and knitting implements received by them are disposed radially and thus precisely in the direction in which centrifugal forces occur in operation, excess lubricant is driven through the tricks, even in the absence of an appreciable pumping action of the knitting implements, to the outer edge of the dial forming the knock-over comb for the knitwear, where it is introduced directly to the fabric. If however, in accordance with the invention, the lubricant is wholly or at least partially prevented from being able to flow radially outwards over the outer edge of the dial on account of the centrifugal forces which arise, the lubricant is at the same time prevented from penetrating into the fabric.

Such measures appear to be superfluous in the region of a needle cylinder or a possibly present sinker ring. With a needle cylinder, whose axis of rotation is as a rule arranged in operation vertically like that of the dial, the centrifugal forces are far less critical, because they only promote radial transfer of the lubricant into the needle cylinder tricks and the cam system parts associated therewith, but not any rise of the lubricant in the vertical direction and thus no direct transfer of the lubricant into the fabric. The same applies to the region of a sinker ring which is possibly present, since the centrifugal forces can here only effect movement of the lubricant directed radially away from the fabric.

BRIEF DESCRIPTION OF THE DRAWINGS

Further advantageous features of the invention appear from the dependent claims.

The invention will now be explained in more detail with reference to embodiments, in conjunction with the accompanying drawings, in which.

DESCRIPTION OF PREFERRED EMBODIMENTS

Figure 1:
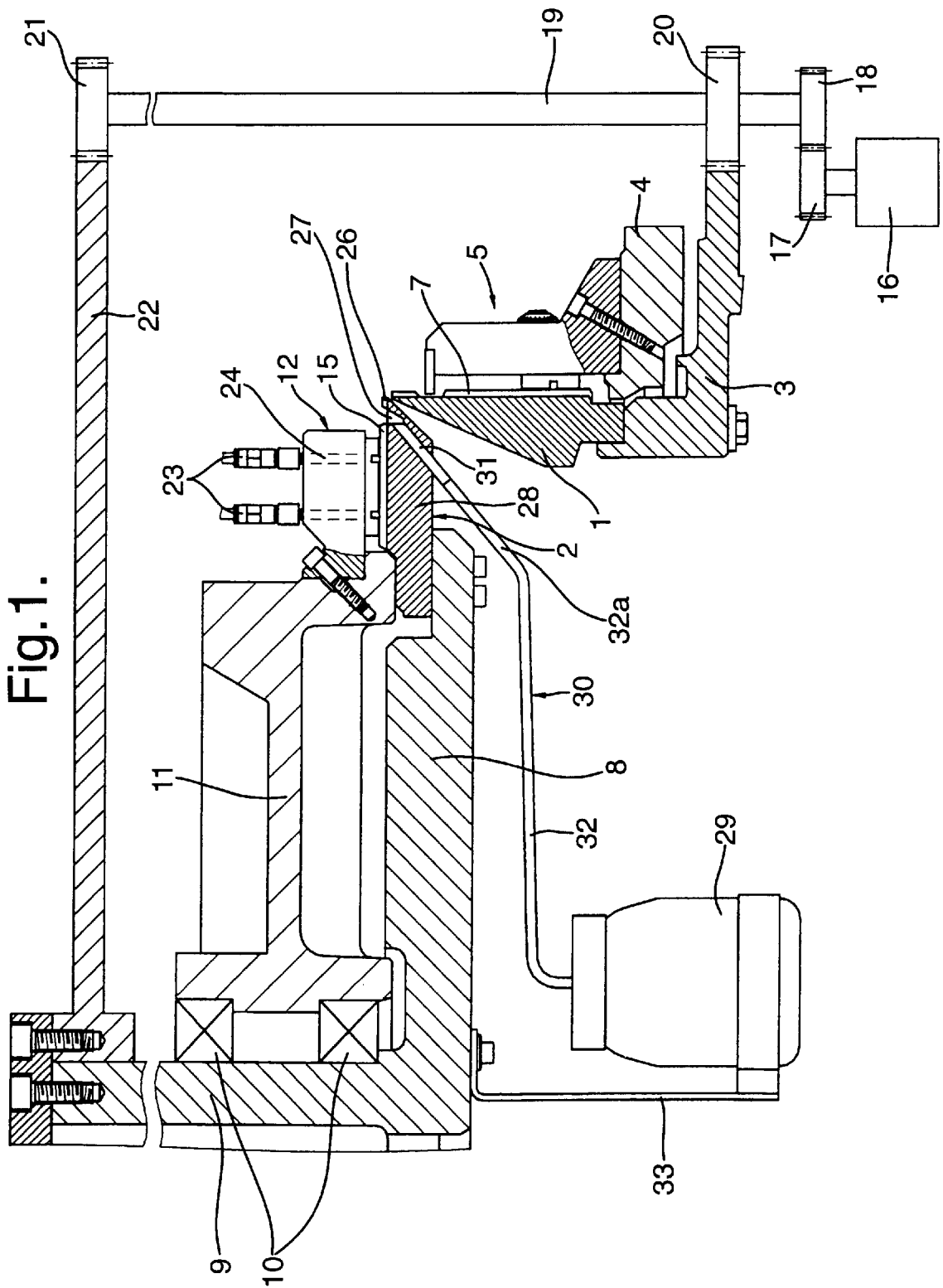
FIG. 1 is a schematic radial section through part of a circular knitting machine according to the invention.

FIG. 1 shows a circular knitting machine with a needle cylinder 1 and a dial 2. The needle cylinder 1 is fixed on a drive gear 3 and is mounted rotatably in a machine frame therewith. A stationary support ring 4 serves to receive a cylinder cam system 5, which is adapted to control knitting implements 6 shown only in FIG. 2, e.g. in the form of cylinder needles, which are mounted slidably in vertical tricks of the needle cylinder 1 formed by lands 7. The dial 2 is coaxial with the needle cylinder 1 and fixed on a support ring 8 also mounted rotatably in the machine frame, this ring being mounted rotatably in a stationary support 11 fixed in the machine frame by means of a support tube 9 coaxial with the axis of rotation of the needle cylinder 1 and bearings 10. The support 11 serves to receive a dial cam system 12, with which the knitting implements 14 are controlled, shown in FIG. 2 and formed as rib needles for example, mounted to slide radially in radially disposed tricks of the dial 2 formed by lands 15.

Synchronous drive of the needle cylinder 1 and the dial 2 is effected for example by a drive motor 16, which drives a pinion 17 which is coupled through a gearwheel 18 to a drive shaft 19. On this there are mounted on the one hand a drive gearwheel 20 meshing with the gearwheel 3 and on the other hand a drive gearwheel 21 which meshes with a gearwheel 22 fixed on the support tube 9.

Circular knitting machines of this kind are generally known to the man skilled in the art and do not therefore need to be explained in detail. However, by way of supplement and for amplification, reference is made to DE-OS 4 128 372 A1, which is hereby incorporated by reference as subject matter of the present disclosure.

In order to lubricate the dial 2, the tricks formed therein and the cam system channels located in the rib cam system 12, connecting nipples 23 are provided round the circumferential direction of the rib cam system 12, which can be connected to the connecting nipples of ordinary oil lubrication devices through hose lines, not shown. The positions and number of these connecting nipples 23 are essentially dependent on the desired distribution of the lubricant which is supplied. Furthermore, such oil lubricating systems are generally known to the man skilled in the art. However, by way of supplement and for amplification, reference is made to DE-OS 3 624 982 A1, which is hereby incorporated by reference as subject matter of the present disclosure. The connecting nipples 23 are connected by channels 24 shown in broken lines and optionally provided at their ends with spray nozzles, to selected parts of the cam system channels for example, so that lubricating oil supplied under pressure passes from thence into the tricks of the dial 2 formed by the lands 15 and receiving the knitting implements 14.

Figure 2:
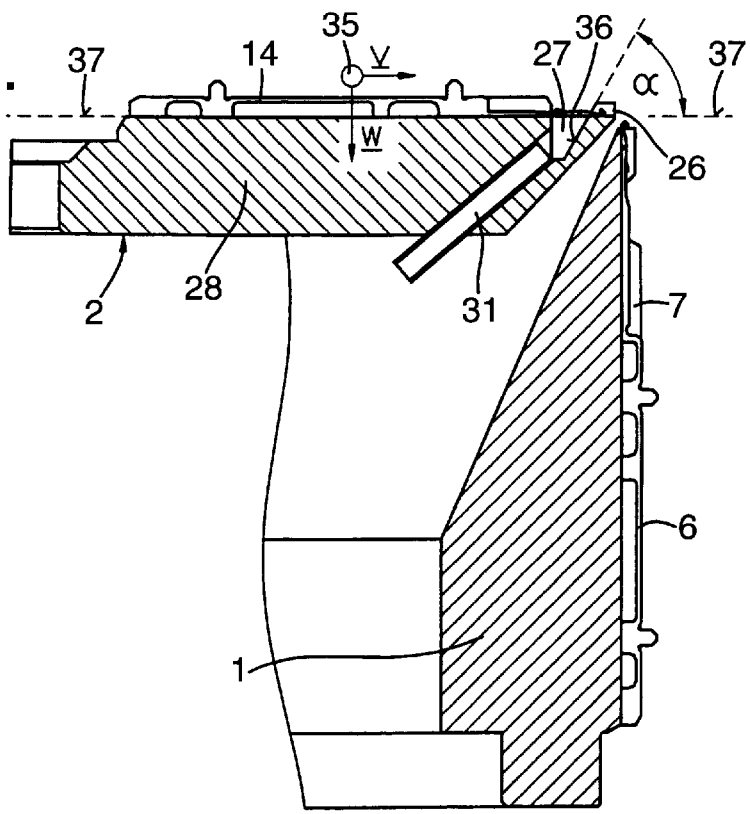
FIG. 2 is a view of just the dial and the needle cylinder of the circular knitting machine according to FIG. 1 to a larger scale, omitting the lubricating device and the cam system, but each including a knitting implement.
Figure 3:
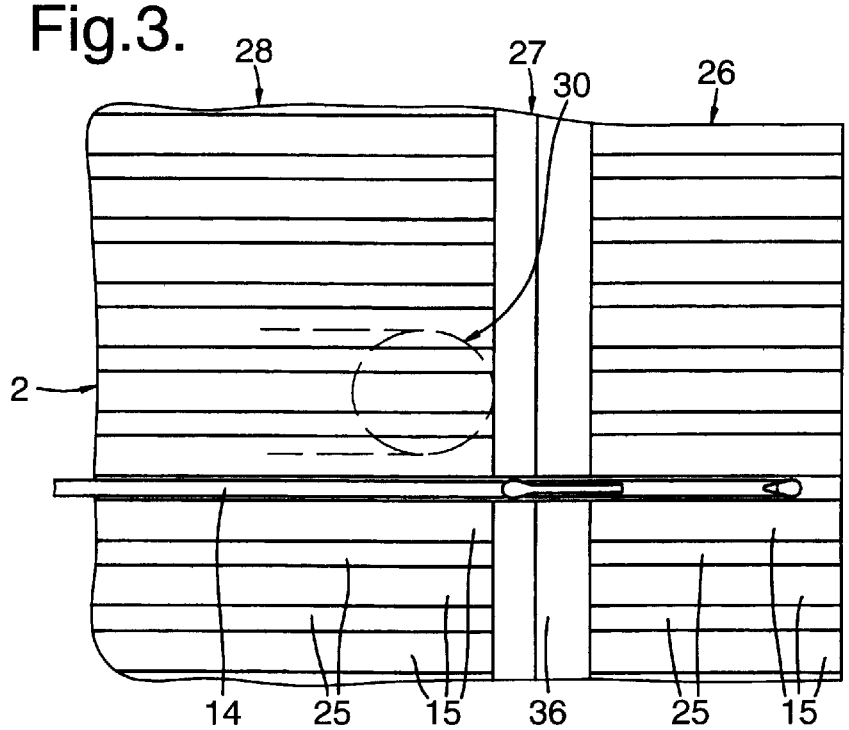
FIG. 3 is a schematic, enlarged plan view of just the dial according to FIG. 2 in the region of its knock-over comb.

FIG. 3 shows an enlarged plan view of the dial according to FIG. 2, where however only a single knitting implement 14 in the form of a rib needle is indicated to clarify the various parts and wherein moreover only the lands 15 and tricks 25 lying there-between and formed radially in the dial body to receive the knitting implements 14 are shown.

In accordance with the invention, an annular section 26 of the dial 2, which is as a rule designed as a knock-over comb for the stitches to be formed with the knitting implements 14, is separated from the section 28 lying radially inwards of the dial 2 carrying the main part of the knitting implements 14 by a surrounding, also annular recess formed as a catch channel 27. As is shown in particular by FIGS. 2 and 3, the catch channel 27 is formed with sufficient depth and width in the dial body, starting from the bottom of the tricks 25. The bottom of the catch channel 27 furthermore opens into a collecting container 29 (FIG. 1) and is to this end connected thereto preferably by means of at least one drain line 30. The drain line 30 consists for example of a duct 31 which runs from an opening formed in the lower region of the drain channel 27 and passes through the dial 2 obliquely, downwardly and inwardly, and into a tube 32 connected to the duct 31 and opening into the collecting container 29. The collecting container 29 is fixed in accordance with FIG. 1 on the underside of the dial arrangement by means of a bracket 33, e.g. on its support ring 8 and can therefore rotate with the dial arrangement, like the drain line 30.

The purpose of the catch channel 27 is to catch the oil which flows radially outwards in the tricks 25 on account of centrifugal force during rotation of the dial 2, so that it does not travel further radially outwards, get into the extensions of the tricks 25 formed in the knock-over comb 26 and from thence get transferred to the fabric being made. The width and depth of the catch channel 27 are so selected to this end that, as is schematically indicated in FIG. 2, drops of lubricant 35 moving in the direction of an arrow v, especially oil drops, are drawn reliably into the catch channel 27 by the force of gravity (arrow w) also acting on the lubricant drops 35, in spite of the existence of the centrifugal force. Accordingly it is advantageous if both the width and the depth of the catch channel 27 are appreciably greater than the diameter of such a lubricant drop which can form on account of the surface tension involved. In particular the catch channel 27 is, as FIG. 2 shows, substantially wider and deeper than the height of those sections of the knitting implements 14 which bridge over the catch channel 27. This involves as a rule those sections of normal rib needles which comprise the needle stem, the needle hooks and also the pivotally mounted needle latches when latch needles are used, since the catch channel 27 is disposed in the vicinity of the section 26 forming the knock-over comb.

The depth and the width of the catch channel 27 should in particular be made large enough for the lubricant in the catch channel 27 not to touch the undersides of the knitting implements 14, so that it cannot be drawn along by them and transferred to the fabric. Moreover, lubricant should not be able to build up in the catch channel 27 and the drain lines 30 connected thereto but should flow away rapidly enough in the direction of the collecting container 29. The depth and the width of the catch channel 27 and the crosssection of the drain lines 30 therefore also depend on the kind, in particular the viscosity, of the lubricant employed and have to be determined by experiment in each particular case. Initial experiments on circular border knitting machines with a diameter of 30" have shown that a depth of about 3 mm should be selected when using an ordinary lubricant and the width of the catch channel 27 should also amount to about 3 mm at least at its widest point, i.e. in the upper region just below the knitting implements 14. For preference, the cross-section of the drain lines 30 should thus also be chosen correspondingly.

In order that lubricant drops 35 introduced to the catch channel 27 shall not be thrown out again radially from the catch channel 27 by the centrifugal forces but shall flow safely into the drain line 30 and thence into the collecting container 29, the catch channel 27 is bounded at the radially outer edge of the dial 2 by a wall 36 (FIG. 2) which makes a predetermined minimum angle α with a plane perpendicular to the conceptual axis of rotation of the dial 2 and of the needle cylinder 1, shown by a line 37 and running parallel to the bottoms of the tricks 25. The radially inner wall of the catch channel 27 opposite the wall 36 is disposed vertically for example so that its angle of inclination is essentially non-critical.

The angle α is so calculated, taking into account the centrifugal force, that an oil drop in the catch channel 27 cannot flow up on the wall 36. To this end, the component $x = F_z \cdot \cos \alpha$ of the centrifugal force acting up along the wall 36, regarded as an inclined plane, must be smaller than the component $y = F_g \cdot \sin \alpha$ of the force of gravity acting downwardly along the wall 36 or at the most these components must be equal. With x=y we have $\tan \alpha = F_z/F_g$ and $\tan \alpha = 4\pi^2 \cdot r \cdot n^2/g$, where g is the acceleration due to gravity, r is the radius of the dial and n the speed of rotation of the dial 2. Simplifying, we have $\tan \alpha = k \cdot r \cdot n^2$, where k is a constant. It can be calculated from this that, with a nominal speed of e.g. 30 rpm and a nominal diameter of the dial of 30", a minimum angle α=21° and with a nominal speed of e.g. 50 rpm and a nominal diameter of the dial of 10", a minimum angle α=30.1° must be selected. The smaller the nominal diameter, the greater the minimum angle α has to be. If the said minimum angles are adhered to or chosen larger, the lubricant drops 35 can no longer escape radially outwardly after entering the catch channel 27. Rather they drain down into the collecting container 29.

In order to ensure reliable draining of the oil out of the catch channel 27 into the collecting container 29, at least the duct 31 directly adjoining the catch channel 27 and advantageously also the adjoining section 32a of the pipe 32 are inclined relative to the plane 37 at the angle α or more in a preferred development of the invention. This ensures that, even when a larger amount of lubricant builds up in this part 30a, there is no danger that the lubricant will flow back into the catch channel 27.

All in all the dial arrangement is thus provided according to the invention with means which above all prevent, or at least strongly reduce, the escape of lubricant under the influence of centrifugal force over the radially outer edge of the dial 2.

Figure 4:
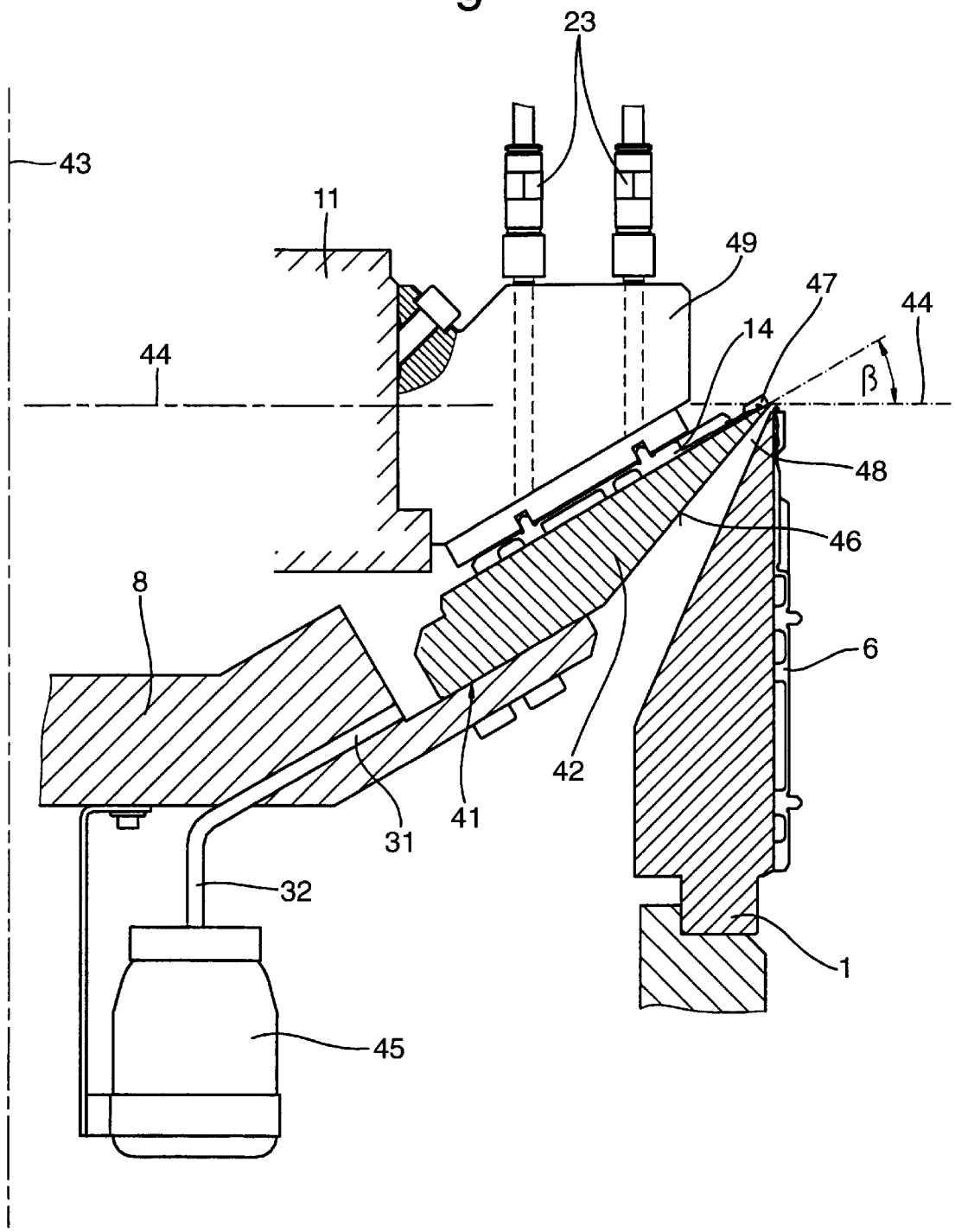
FIG. 4 is a section corresponding to FIG. 2 through a second embodiment of the circular knitting machine according to the invention.

A second embodiment of the invention is shown in FIG. 4, where the same reference numerals are used for like parts. In this embodiment a dial 41 is provided as the means for preventing or at least reducing the radial escape of lubricant, in which at least a section 42 with the tricks for the knitting implements 14 makes a predetermined minimum angle β with a plane which extends perpendicular to a schematically indicated axis of rotation 43 and which is denoted by the reference numeral 44. The same applies for the smallest value of the angle β as specified above for the smallest value of the angle α, i.e. the angle β is also selected taking into account the dial diameter and the dial speed. Moreover, in contrast to FIGS. 1 to 3, the angle β is so selected that the component of the centrifugal force acting on the lubricant in operation is at the most equal to the component of the force of gravity acting on the lubricant, and is preferably smaller, even within the tricks receiving the knitting implements 14. Since the whole dial and thus also the bottoms of the tricks receiving the knitting implements 14 are inclined at the angle β according to FIG. 4, the lubricant automatically flows in these tricks downwardly and inwardly, against the centrifugal force, so that it can easily be caught there by a collecting container 45. In order that the lower edge 46 of the dial 41 shall not in this case restrict an entry gap 48 for the fabric to be made in the region of a knock-over comb 47, it preferably runs in accordance with FIG. 4 at an acute angle to the bottoms of the dial tricks.

In order that the knitting implements 14 can be controlled in this embodiment like in FIGS. 1 to 3, a schematically indicated dial cam system 49 corresponding to the dial cam system 12 is advantageously arranged at the same inclination (angle β) as the section 42 of the dial 41. It will be understood that the angle β should in this case preferably correspond to about the smallest possible angle or have a sufficiently small value between the minimum angle and the 90° position, since too great an angle between the two knitting implement carriers 1,2 is undesirable for reasons of knitting technology.

The invention is not restricted to the described embodiments, which can be modified in many ways. This applies in particular to the constructional design of the dials 2 and 41 shown only by way of example, of the needle cylinder 1 and of the knitting implements 6 and 14. Furthermore an open, pan-like collecting container could be provided instead of the closed collecting container 29. The catch channel 27 according to FIGS. 1 to 3 can moreover be formed in several parts and have sections in the circumferential direction offset from one another in the radial direction. It would further be possible to provide two or more catch channels spaced in the radial direction, insofar as the knitting implement form in question allows. Finally it will be understood that the different features could be combined with one another in other than the way shown and described.

It will be understood that each of the elements described above, or two or more together, may also find a useful application in other types of constructions differing from the types described above.

While the invention has been illustrated and described as a dial arrangement for preventing or reducing the escape of lubricant and the contamination of fabric therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circular knitting machine with a dial arrangement comprising: a dial (2,41) rotatable about an axis of rotation and having tricks (25) for knitting implements (14), a stationary dial cam system (12), a device (23) for feeding a lubricant to said dial arrangement, a collecting container (29) for reception of lubricant escaping from said dial arrangement via a drain means and means being associated with said dial arrangement which prevent or at least reduce the escape of lubricant consequent upon the effect of the centrifugal force over the radially outer edge of said dial (2,41).

2. A circular knitting machine according to claim 1, wherein the means for the prevention or reduction of escape of lubricant is a force counteracting the centrifugal force of the lubricant during rotation of said dial (2,41).

3. A circular knitting machine according to claim 1, wherein said means for preventing or reducing the escape of lubricant comprise at least one catch channel (27) formed in said dial (2).

4. A circular knitting machine according to claim 3, wherein said dial (2) has an radially outer edge and wherein said catch channel (27) is disposed at said edge of said dial (2) and opens into said collecting container (29).

5. A circular knitting machine according to claim 4, wherein said collecting container (29) is fixed to a part of said dial arrangement lying radially inside said outer dial edge and is connected to said catch channel (27) via said drain means formed as at least one drain line (30).

6. A circular knitting machine according to claim 4, wherein said catch channel (27) runs from bottoms of said tricks (25) and is bounded at said radially outer edge of the dial (2) by a wall (36) which is at a predetermined minimum angle ($\alpha$) with a plane (37) perpendicular to said axis of rotation.

7. A circular knitting machine according to claim 6, wherein said minimum angle ($\alpha,\beta$) is a function of a diameter and a speed of rotation of said dial (2,41).

8. A circular knitting machine according to claim 5, wherein said drain line (30) has at least one section (31,32a) opening into the catch channel (27), said section having a predetermined minimum angle ($\alpha$) with a plane (37) perpendicular to the axis of rotation.

9. A circular knitting machine according to claim 1, wherein said dial (41) has at least a section (42) with said tricks and an associated section of said cam system, wherein said sections make a predetermined minimum angle ($\beta$) with a plane (44) perpendicular to the axis of rotation, and wherein said means for preventing or reducing the escape of lubricant comprise said dial (41).

10. A circular knitting machine according to any of claims 6, 7 and 8 wherein said minimal angle ($\alpha,\beta$) is so selected that the component of the centrifugal force acting in operation on the lubricant never exceeds the component of the force of gravity acting on the lubricant.

* * * * *